(12) United States Patent
Lee et al.

(10) Patent No.: US 11,912,167 B2
(45) Date of Patent: Feb. 27, 2024

(54) REGENERATIVE RETARDER ENERGY SYSTEM FOR TRAILERS

(71) Applicant: HYUNDAI TRANSLEAD, San Diego, CA (US)

(72) Inventors: Jong Seog Lee, San Diego, CA (US); Humberto Benitez, San Diego, CA (US); Oscar E. Montiel Rosales, San Diego, CA (US); Alvaro J. Frausto, San Diego, CA (US)

(73) Assignee: Hyundai Translead, San Diego, CA (US)

( * ) Notice: Subject to any disclaimer, the term of this patent is extended or adjusted under 35 U.S.C. 154(b) by 206 days.

(21) Appl. No.: 17/580,413

(22) Filed: Jan. 20, 2022

(65) Prior Publication Data
US 2023/0226920 A1    Jul. 20, 2023

(51) Int. Cl.
*B60L 7/10*    (2006.01)
*B60T 1/10*    (2006.01)
*B60L 7/24*    (2006.01)

(52) U.S. Cl.
CPC .............. *B60L 7/10* (2013.01); *B60T 1/10* (2013.01); *B60L 7/24* (2013.01); *B60T 2230/02* (2013.01); *B60T 2250/04* (2013.01); *B60T 2270/60* (2013.01)

(58) Field of Classification Search
CPC ...... B60L 7/10; B60L 7/22; B60L 7/24; B60L 7/18; B60T 2270/60; B60T 1/10; B60T 2230/02; B60T 2250/04; B60T 7/20; B60T 13/586
See application file for complete search history.

(56) References Cited

U.S. PATENT DOCUMENTS

| | | | | |
|---|---|---|---|---|
| 5,507,153 | A * | 4/1996 | Seto ................... | B60H 1/00492 62/133 |
| 9,845,124 | B1 * | 12/2017 | Ingram ................ | B60T 13/586 |
| 2022/0402528 | A1 * | 12/2022 | Gura ..................... | B61C 17/12 |

* cited by examiner

*Primary Examiner* — Sizo B Vilakazi
(74) *Attorney, Agent, or Firm* — Procopio, Cory, Hargreaves & Savitch LLP (57) ABSTRACT

Systems and methods for generating power for a tractor-trailer combination, including: a drop-lift axle coupled to the bottom of the trailer, the drop-lift axle to deploy at least one wheel when a primary brake is applied and the trailer is operating at a predetermined state; at least one regenerative brake retarder coupled to the at least one wheel, the at least one regenerative brake retarder to generate energy when the at least one wheel is deployed, wherein the at least one regenerative brake retarder acts as an auxiliary brake; and an energy storage system configured to store the energy generated by the at least one regenerative brake retarder, the energy storage system to release the stored energy a main battery to power at least one component of the trailer when needed.

20 Claims, 6 Drawing Sheets

REGENERATIVE RETARDER ENERGY SYSTEM FOR TRAILERS

BACKGROUND

Field of the Invention

The present disclosure relates generally to generating power for trailers, and more specifically, to generating power for trailers using a regenerative retarder energy system.

Background

Current energy recovery and storage systems for commercial trailers are very complex and require heavy modifications to the trailer bogie assembly to function properly.

SUMMARY

The present disclosure describes generating power for trailers.

In one implementation, a regenerative braking electrical system for a trailer is disclosed. The system includes: a drop-lift axle coupled to the bottom of the trailer, the drop-lift axle to deploy at least one wheel when a primary brake is applied and the trailer is operating at a predetermined state; at least one regenerative brake retarder coupled to the at least one wheel, the at least one regenerative brake retarder to generate energy when the at least one wheel is deployed, wherein the at least one regenerative brake retarder acts as an auxiliary brake; and an energy storage system configured to store the energy generated by the at least one regenerative brake retarder, the energy storage system to release the stored energy a main battery to power at least one component of the trailer when needed.

In one implementation, the at least one regenerative brake retarder is mounted in a dual configuration. In one implementation, the at least one regenerative brake retarder includes capacitive elements to store the energy generated by the at least one regenerative brake retarder. In one implementation, the capacitive elements are configured to reside within the at least one wheel. In one implementation, the energy storage system is configured to determine whether the trailer is operating at the predetermined state. In one implementation, the predetermined state includes a predetermined speed and a predetermined incline angle. In one implementation, the energy storage system includes a speed controller to determine and compare a speed of the trailer to the predetermined speed. In one implementation, the speed controller includes a radar device. In one implementation, the energy storage system includes an orientation controller to determine and compare an incline angle of the trailer to the predetermined incline angle. In one implementation, the orientation controller includes at least one gyroscope. In one implementation, the orientation controller includes at least one accelerometer. In one implementation, the energy storage system includes a battery charge controller to determine when to release the stored energy to power the at least one component of the trailer.

In another implementation, a method for generating power for a tractor-trailer combination is disclosed. The method includes: deploying a drop-lift axle coupled to at least one wheel when the tractor-trailer combination is operating at a predetermined state; activating at least one regenerative brake retarder coupled to the at least one wheel to generate energy when the at least one wheel is deployed, wherein the at least one regenerative brake retarder acts as an auxiliary brake; and storing the energy generated by the at least one regenerative brake retarder.

In one implementation, the method further includes determining that the tractor-trailer combination is operating at the predetermined state. In one implementation, determining that the trailer is operating at the predetermined state includes sensing that a primary brake of the tractor-trailer combination is applied. In one implementation, determining that the trailer is operating at the predetermined state includes determining whether a speed of the tractor-trailer combination is above a predetermined speed. In one implementation, determining that the trailer is operating at the predetermined state includes determining whether an incline angle of the tractor-trailer combination is less than a predetermined angle. In one implementation, the energy generated by the at least one regenerative brake retarder is stored in capacitive elements. In one implementation, the method further includes checking whether a main battery needs charging. In one implementation, the method further includes releasing the stored energy to the main battery when it is determined that the main battery needs charging.

Other features and advantages of the present disclosure should be apparent from the present description which illustrates, by way of example, aspects of the present disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

As described above, current energy recovery and storage systems for commercial trailers are very complex and require heavy modifications to the trailer bogie assembly to function properly. Therefore, to address the issues involved with the modifications to the trailer bogie assembly, certain implementations of the present disclosure provide a regenerative braking electrical system for trailers with energy storage capabilities that is separate from the trailer suspension for easier installation. Accordingly, after reading this description it will become apparent how to implement the present disclosure in various implementations and applications. Although various implementations of the present disclosure will be described herein, it is understood that these implementations are presented by way of example only, and not limitation. As such, this detailed description of various implementations should not be construed to limit the scope or breadth of the present disclosure.

Figure 1:
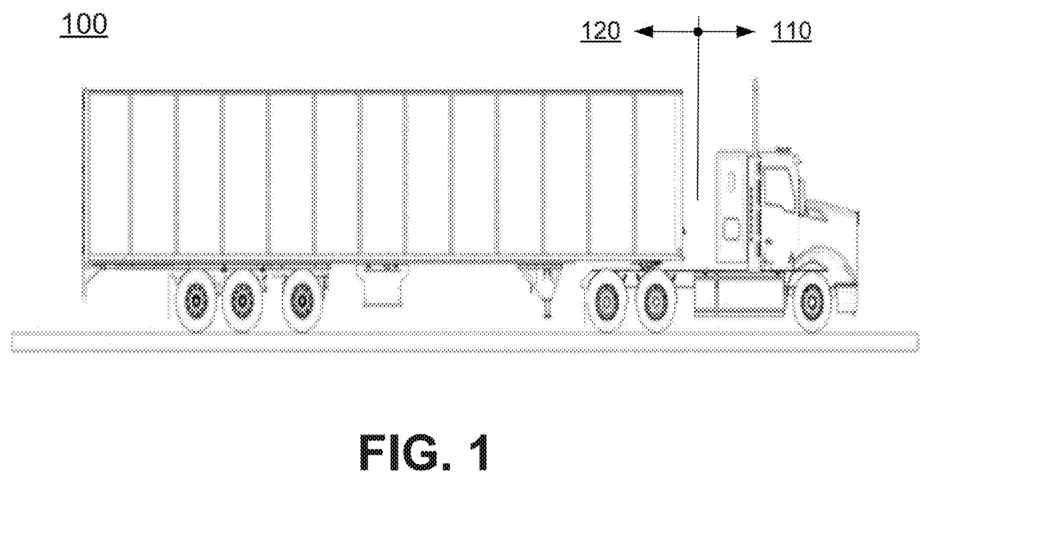
FIG. 1 is a diagram of the tractor-trailer showing the tractor and the trailer.

FIG. 1 is a diagram of the tractor-trailer 100 showing the tractor 110 and the trailer 120. In one implementation, the trailer includes a regenerative braking electrical system. The tractor 110 includes an engine and can operate independent of the trailer 120. In operation, the trailer 120 attaches to the tractor 110 and holds the freight.

Figure 2:
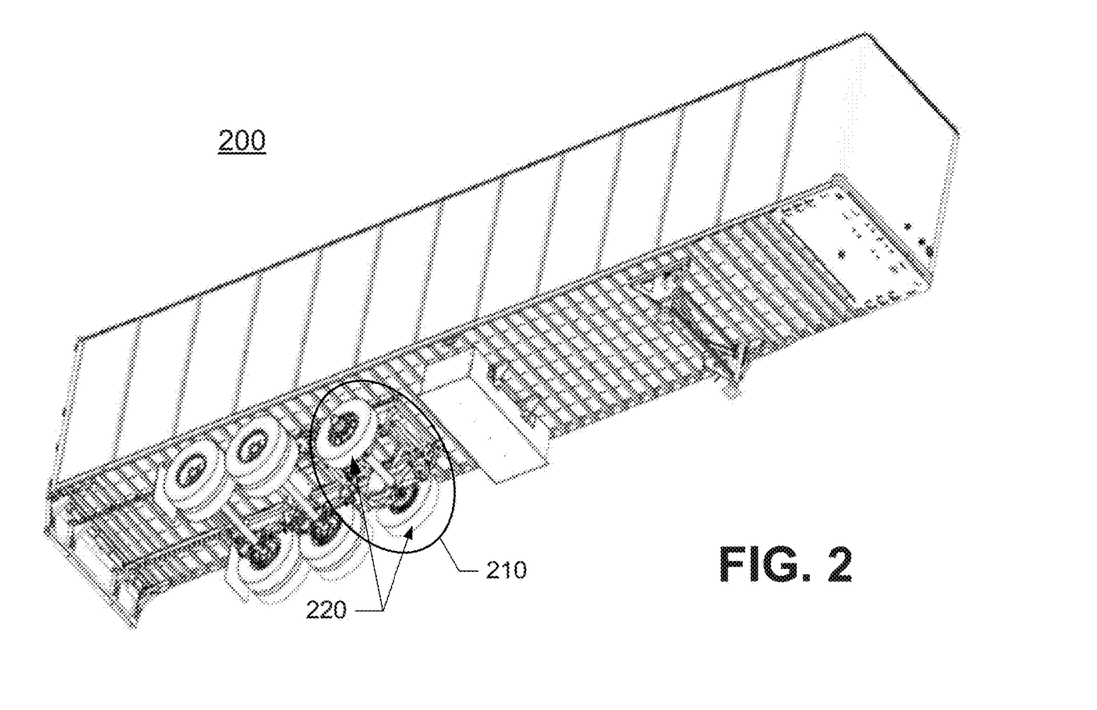
FIG. 2 is a bottom perspective view of a trailer in accordance with one implementation of the present disclosure.

FIG. 2 is a bottom perspective view of a trailer 200 in accordance with one implementation of the present disclosure. In one implementation, the trailer 200 includes a regenerative braking electrical system 210 with energy storage capabilities, which is separate from the trailer suspension. The system 210 can be used to power transport refrigeration unit (TRU) or other trailer components (e.g., liftgate, heater, etc.). The TRU is a refrigeration system powered by diesel internal combustion engines, electric motors, or cryogenic liquid/gas. The TRU is designed to refrigerate or heat perishable products that are transported in various containers, including truck vans, semi-truck trailers, shipping containers, and railcars. The system 210 can also be used to power the tractor and/or trailer for alternative-fuel vehicles (e.g., electric, hydrogen, hybrid, etc.).

In one implementation, the regenerative braking electrical system 210 is mounted outside the legacy suspension system and acts as an auxiliary braking device independent of the legacy suspension system on the trailer. In one implementation, the legacy suspension system may use friction brakes such as hub and drum or disc brakes that use brake pads and friction forces to stop a vehicle. Thus, the regenerative braking electrical system 210 does not affect the performance of the trailer suspension but simplifies the installation on the trailer. The system 210 includes regenerative brake retarders 220 which are mounted in either a single or dual configuration (depending on the power requirements). A regenerative brake retarder is an auxiliary braking device that can recover kinetic energy used to slow down the vehicle and convert energy to a usable power form to charge a battery pack. In the illustrated implementation of FIG. 2, the regenerative brake retarders 220 are mounted in a dual configuration. In other implementations, the system 210 is expandable to multiple retarders to increase the power capacity.

Figure 3:
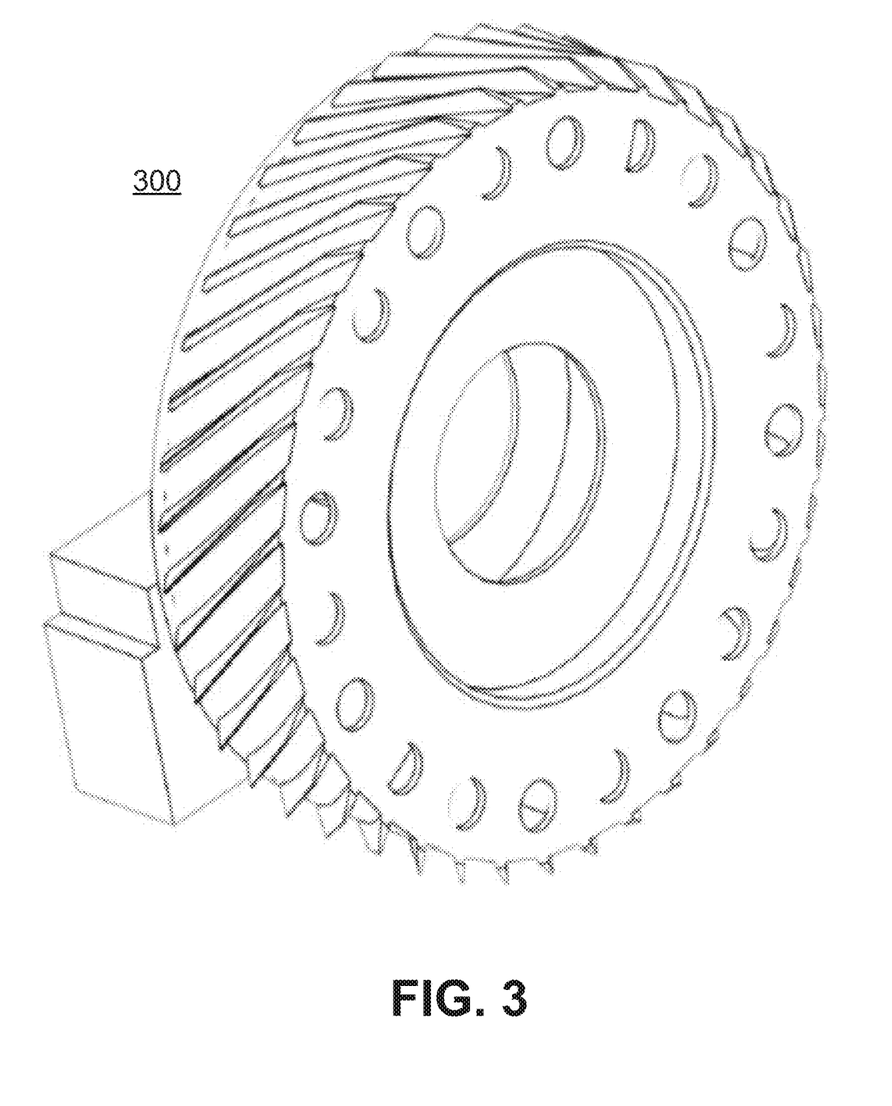
FIG. 3 is a detailed perspective view of a regenerative brake retarder in accordance with one implementation of the present disclosure.

FIG. 3 is a detailed perspective view of a regenerative brake retarder 300 in accordance with one implementation of the present disclosure.

Figure 4:
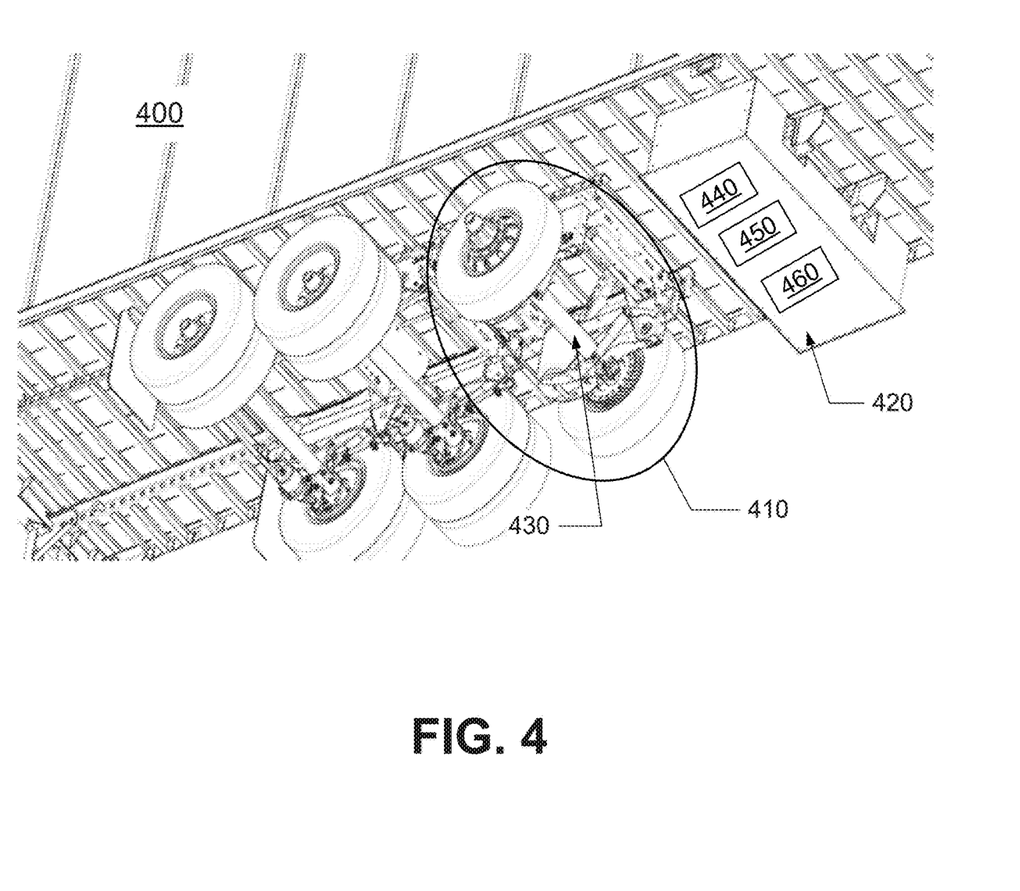
FIG. 4 is a bottom perspective view of a trailer showing a regenerative braking electrical system including a drop-lift axle and an energy storage system (ESS) in accordance with another implementation of the present disclosure.

FIG. 4 is a bottom perspective view of a trailer 400 showing a regenerative braking electrical system 410 including a drop-lift axle 430 and an energy storage system (ESS) 420 in accordance with another implementation of the present disclosure. In one implementation, the drop-lift axle 430 is configured as independent of the existing trailer suspension to simplify installation and only work as an auxiliary braking device. In one implementation, the ESS 420 is configured to store and release energy from a renewable source (i.e., the regenerative brake retarders). Thus, the ESS 420 stores the energy generated by the regenerative brake retarders and releases the energy to a main battery to power components of the trailer when needed.

In one implementation, the ESS 420 also includes at least a speed controller 440, a gyroscope controller 450, and a battery charge controller 460. When the brakes are applied on the tractor, the speed controller 440 checks the current speed of the tractor. If the vehicle speed is above a predetermined speed (e.g., greater than 40 mph), then the gyroscope controller 450 checks the incline angle of the tractor-trailer combination. If the incline angle is less than a predetermined angle (e.g., less than −1 degree incline which is less than 1-degree decline), then the drop-lift axle is deployed. Once the wheels touch the ground and begin spinning, the regenerative brake retarders on the wheel ends activate and assist the friction brakes to slow down the trailer. During the braking of the trailer, the regenerative retarders convert and store the kinetic energy in capacitive elements. The battery charge controller 460 then checks the capacity of the battery. If the battery charge controller 460 determines that the battery needs charge, the power from the capacitive elements are used to charge the main batteries.

Figure 5:
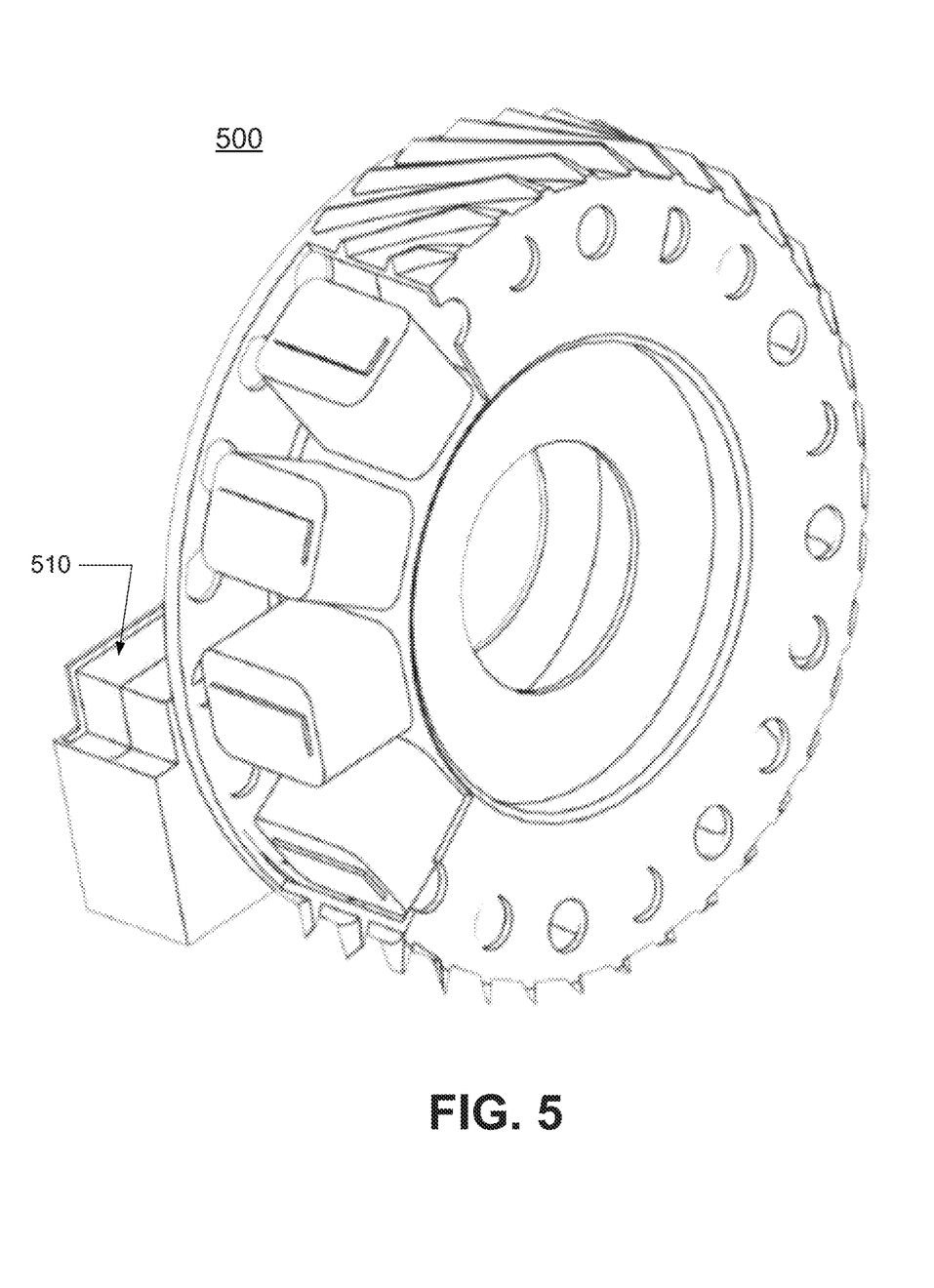
FIG. 5 is a cut-away view of the regenerative brake retarder in accordance with one implementation of the present disclosure.

FIG. 5 is a cut-away view of the regenerative brake retarder 500 in accordance with one implementation of the present disclosure. In the illustrated implementation of FIG. 5, the regenerative brake retarder 500 includes capacitive elements 510 to store the kinetic energy converted by the regenerative retarders. As discussed above, during the braking of the trailer, the regenerative retarders convert and store the kinetic energy in the capacitive elements 510. The battery charge controller 460 then checks the capacity of the battery. If the battery charge controller 460 determines that the main batteries need charge, the power from the capacitive elements 510 are used to charge the main batteries.

Figure 6:
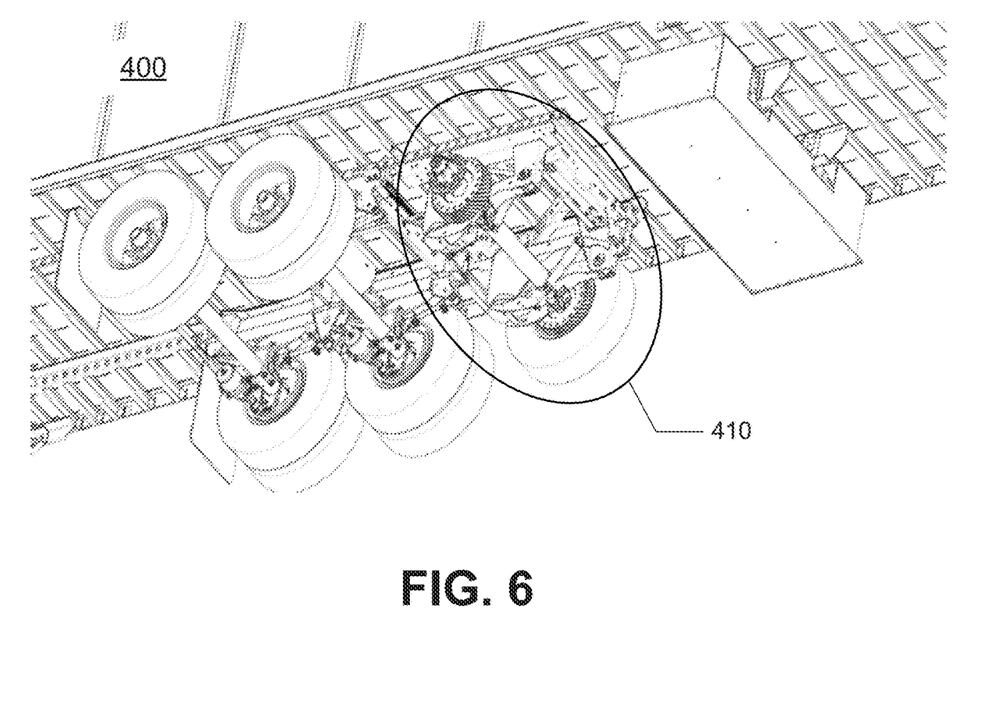
FIG. 6 is another bottom perspective view of the trailer showing the regenerative braking electrical system with a wheel assembly removed to show the brake retarders in accordance with another implementation of the present disclosure.

FIG. 6 is another bottom perspective view of the trailer 400 showing the regenerative braking electrical system 410 with a wheel assembly removed to show the brake retarders in accordance with another implementation of the present disclosure.

Figure 7:
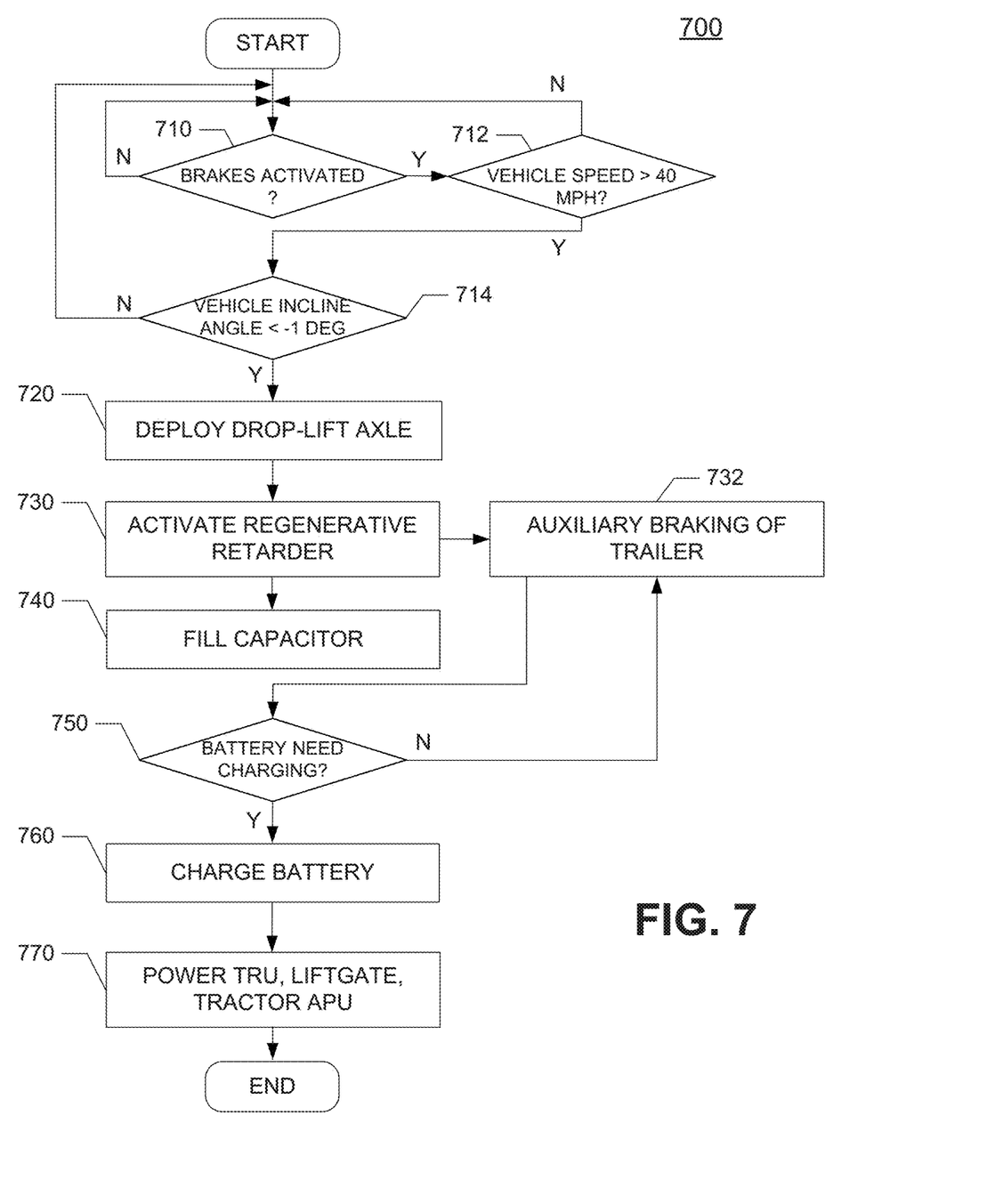
FIG. 7 is a flow diagram illustrating a process for generating power using the regenerative braking electrical system in accordance with one implementation of the present disclosure.

FIG. 7 is a flow diagram 700 illustrating a process for generating power using the regenerative braking electrical system 410 in accordance with one implementation of the present disclosure. In one implementation, the regenerative braking electrical system 410 is designed to only deploy and work in certain conditions to efficiently produce power.

In the illustrated implementation of FIG. 7, when the brakes are activated or applied on the tractor by a driver, at step 710, the current speed of the tractor is checked, at step 712. In one implementation, the current speed is checked by the speed controller 440. In other implementations, other devices such as radar sensors are used to check the speed. If the vehicle speed is determined, at step 712, to be above a predetermined speed (e.g., greater than 40 mph), then the incline angle of the tractor-trailer combination is determined, at step 714. In one implementation, the incline angle is determined by the gyroscope controller 450. In other implementations, other devices such as accelerometers are used to determine the incline angle. If the incline angle is determined, at step 714, to be less than a predetermined angle (e.g., incline angle less than −1 degree which is less than 1-degree decline angle), then the drop-lift axle 430 is deployed, at step 720. Once the wheels touch the ground and begin spinning, the regenerative brake retarders 220 on the wheel ends activate, at step 730, and assist the friction brakes to slow down the trailer (step 732).

During the braking of the trailer, the regenerative retarders convert and store the kinetic energy in the capacitive elements 510, at step 740. During the use of the regenerative retarders for auxiliary braking of the trailer, at step 732, the battery charge controller 460 continues to check the capacity of the battery, at step 750. If the battery charge controller 460 determines, at step 750, that the battery needs charging, the power from the capacitive elements 510 is used to charge the main batteries, at step 760. Otherwise, if the battery charge controller 460 determines, at step 750, that the battery does not need charging, the regenerative retarders continue to convert and store the kinetic energy in the capacitive elements 510 (step 740) and used for auxiliary braking of the trailer (step 732). The battery is then be used, at step 770, to power the electrical TRU, other trailer components, and/or the tractor.

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure. Thus, the present disclosure is not intended to be limited to the implementations shown herein but is to be accorded the widest scope consistent with the principal and novel features disclosed herein.

Those of skill in the art will appreciate that the various illustrative modules and method steps described herein can be implemented as electronic hardware, software, firmware or combinations of the foregoing. To clearly illustrate this interchangeability of hardware and software, various illustrative modules and method steps have been described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the present disclosure. Further, the grouping of functions within a module or step is for ease of description. Specific functions can be moved from one module or step to another without departing from the present disclosure.

All features of the above-discussed examples are not necessarily required in a particular implementation of the present disclosure. Further, it is to be understood that the description and drawings presented herein are representative of the subject matter that is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A regenerative braking electrical system for a trailer, the system comprising:
    a drop-lift axle coupled to the bottom of the trailer, the drop-lift axle to deploy at least one wheel when a primary brake is applied and the trailer is operating at a predetermined state;
    at least one regenerative brake retarder coupled to the at least one wheel, the at least one regenerative brake retarder to generate energy when the at least one wheel is deployed, wherein the at least one regenerative brake retarder acts as an auxiliary brake; and
    an energy storage system configured to store the energy generated by the at least one regenerative brake retarder, the energy storage system to release the stored energy to a main battery to power at least one component of the trailer when needed.

2. The system of claim 1, wherein the at least one regenerative brake retarder is mounted in a dual configuration.

3. The system of claim 1, wherein the at least one regenerative brake retarder comprises capacitive elements to store the energy generated by the at least one regenerative brake retarder.

4. The system of claim 3, wherein the capacitive elements are configured to reside within the at least one wheel.

5. The system of claim 1, wherein the energy storage system is configured to determine whether the trailer is operating at the predetermined state.

6. The system of claim 5, wherein the predetermined state includes a predetermined speed and a predetermined incline angle.

7. The system of claim 6, wherein the energy storage system comprises a speed controller to determine and compare a speed of the trailer to the predetermined speed.

8. The system of claim 7, wherein the speed controller includes a radar device.

9. The system of claim 6, wherein the energy storage system comprises an orientation controller to determine and compare an incline angle of the trailer to the predetermined incline angle.

10. The system of claim 9, wherein the orientation controller includes at least one gyroscope.

11. The system of claim 9, wherein the orientation controller includes at least one accelerometer.

12. The system of claim 1, wherein the energy storage system comprises a battery charge controller to determine when to release the stored energy to power the at least one component of the trailer.

13. A method for generating power for a tractor-trailer combination, the method comprising:
    deploying a drop-lift axle coupled to at least one wheel when the tractor-trailer combination is operating at a predetermined state;
    activating at least one regenerative brake retarder coupled to the at least one wheel to generate energy when the at least one wheel is deployed, wherein the at least one regenerative brake retarder acts as an auxiliary brake; and
    storing the energy generated by the at least one regenerative brake retarder.

14. The method of claim 13, further comprising determining that the tractor-trailer combination is operating at the predetermined state.

15. The method of claim 14, wherein determining that the trailer is operating at the predetermined state includes sensing that a primary brake of the tractor-trailer combination is applied.

16. The method of claim 14, wherein determining that the trailer is operating at the predetermined state includes determining whether a speed of the tractor-trailer combination is above a predetermined speed.

17. The method of claim 14, wherein determining that the trailer is operating at the predetermined state includes determining whether an incline angle of the tractor-trailer combination is less than a predetermined angle.

18. The method of claim 13, wherein the energy generated by the at least one regenerative brake retarder is stored in capacitive elements.

19. The method of claim 13, further comprising checking whether a main battery needs charging.

20. The method of claim 19, further comprising releasing the stored energy to the main battery when it is determined that the main battery needs charging.

\* \* \* \* \*